US011083326B2

(12) United States Patent
Morin

(10) Patent No.: US 11,083,326 B2
(45) Date of Patent: Aug. 10, 2021

(54) GROUND COFFEE DISPENSER FOR A COFFEE MACHINE PROVIDED WITH A TURBINE WITH CURVED BLADES

(71) Applicant: SEB S.A., Ecully (FR)

(72) Inventor: Gilles Morin, Varois et Chaignot (FR)

(73) Assignee: SEB S.A., Ecully (FR)

( * ) Notice: Subject to any disclaimer, the term of this patent is extended or adjusted under 35 U.S.C. 154(b) by 351 days.

(21) Appl. No.: 16/305,978

(22) PCT Filed: May 30, 2017

(86) PCT No.: PCT/FR2017/051350
§ 371 (c)(1),
(2) Date: Nov. 30, 2018

(87) PCT Pub. No.: WO2017/207919
PCT Pub. Date: Dec. 7, 2017

(65) Prior Publication Data
US 2019/0208951 A1 Jul. 11, 2019

(30) Foreign Application Priority Data

Jun. 2, 2016 (FR) ...................................... 1655051

(51) Int. Cl.
*A47J 31/40* (2006.01)
(52) U.S. Cl.
CPC .................................. *A47J 31/404* (2013.01)
(58) Field of Classification Search
CPC .. A47J 31/40; A47J 31/42; A47J 31/44; A47J 31/4403; A47J 43/04; A47J 43/07;
(Continued)

(56) References Cited

U.S. PATENT DOCUMENTS 3,305,139 A 2/1967 Ward
6,964,355 B2 * 11/2005 Landau ................. A47G 19/34
222/185.1

(Continued)

FOREIGN PATENT DOCUMENTS

FR 2 682 271 A1 4/1993
FR 2 784 567 A1 4/2000
WO WO 2007/051558 A1 5/2007

OTHER PUBLICATIONS

International Search Report as issued in International Patent Application No. PCT/FR2017/051350, dated Aug. 14, 2017.

*Primary Examiner* — Justin C Dodson
(74) *Attorney, Agent, or Firm* — Pillsbury Winthrop Shaw Pittman LLP

(57) ABSTRACT

A ground coffee dispenser intended to cooperate with a coffee machine, includes a ground coffee storage reservoir provided with a contour and a bottom, and a ground coffee distributor pouring a predefined quantity of ground coffee from the reservoir into a brewing area of the machine. The distributor includes a disk driven in rotation, curved blades being attached onto a lower face of the disk. The quantity of ground coffee poured is defined by a peripheral space provided between the diameter of the periphery of the disk and an inner wall of the contour, close to the bottom of the storage reservoir. The bottom of the reservoir includes an opening for transferring the ground coffee arranged under the disk. The curved blade extends from the periphery towards the inside of the disk to transfer the ground coffee admitted by the peripheral space into the transfer opening when the disk rotates.

18 Claims, 4 Drawing Sheets

(58) Field of Classification Search
CPC ............... A47J 43/0705; A47J 43/0711; A47J 43/0716; A47J 43/0722; A47J 43/082; A47J 43/085; G01F 11/10; G01F 11/14; G01F 11/18; G01F 11/20; G01F 11/24; A47G 19/32; A47G 19/34
See application file for complete search history.

(56) References Cited

U.S. PATENT DOCUMENTS

| | | | | |
|---|---|---|---|---|
| 2008/0148956 | A1* | 6/2008 | Maurer | A47J 31/02 99/287 |
| 2008/0230568 | A1* | 9/2008 | Schweizer | B65G 65/4836 222/411 |
| 2009/0145303 | A1* | 6/2009 | Lebuffe | A47J 31/404 99/289 R |
| 2011/0163131 | A1* | 7/2011 | Mih | B01F 7/00125 222/410 |
| 2012/0024160 | A1* | 2/2012 | Van Os | A47J 31/40 99/280 |
| 2014/0072689 | A1* | 3/2014 | Ho | A47J 31/0605 426/569 |
| 2015/0122131 | A1* | 5/2015 | Te Velde | A47J 42/16 99/286 |
| 2016/0128516 | A1* | 5/2016 | Gherman | A47J 43/0722 366/205 |

* cited by examiner

GROUND COFFEE DISPENSER FOR A COFFEE MACHINE PROVIDED WITH A TURBINE WITH CURVED BLADES

CROSS-REFERENCE TO RELATED APPLICATIONS

This application is the U.S. National Stage of International Application Serial No. PCT/FR2017/051350, filed May 30, 2017, which in turn claims priority to French Application No. 1655051, filed Jun. 2, 2016.

The invention concerns a ground coffee dispenser intended to cooperate with a coffee machine and which comprises in particular a ground coffee storage reservoir and a ground coffee distributor.

The invention aims in particular at a ground coffee dispenser in which the ground coffee distributor comprises one or more blades and is configured to pour a predefined quantity of ground coffee from the storage reservoir towards a filter holder arranged on the coffee machine, the said filter holder constituting a brewing area.

The principal objective is to optimize the ground coffee dispenser in order to reduce the dimensions and the overall manufacturing cost of the coffee machine.

STATE OF THE ART

Coffee machines have been in existence for many years and are very well known to the person skilled in the art.

A coffee machine traditionally comprises a filter holder for receiving a filter and in which the ground coffee is placed when the coffee beverage is being prepared. The coffee machine comprises a water tank and a hot water dispensing system configured to draw water from the tank, heat this water and then pour it into the filter holder containing the ground coffee. The hot water poured onto the ground coffee allows it to brew, the mixture then being filtered to extract from it the coffee beverage, the coffee grounds remaining contained in the used filter.

Certain coffee machines are equipped with a ground coffee dispenser provided with a ground coffee storage reservoir, a ground coffee distributor and a device for transferring the ground coffee from the storage reservoir towards the filter holder. This type of coffee machine has the advantage of avoiding storage of the opened package of ground coffee in a storage area, requiring said package to be removed each time the filter holder must be filled to prepare a coffee beverage.

In particular, we will cite the patent application published under the number FR2682271A1 disclosing such a coffee machine in which the ground coffee dispenser comprises a ground coffee storage reservoir provided with a contour and a bottom, and a ground coffee distributor pouring a predefined quantity of ground coffee from the storage reservoir towards the brewing area of the coffee machine. The ground coffee distributor comprises a disk driven in rotation, four curved blades being attached on the lower face of the said disk. The disk has a periphery inscribed in a diameter D, the quantity of ground coffee poured being defined by a peripheral space provided between the diameter D of the periphery of the disk and an inner wall of the contour, close to the bottom of the storage reservoir. Each curved blade has an anterior extremity situated at a distance from the inner wall of the contour, that is, proximally with respect to the axis of rotation of the disk, and a posterior extremity which extends beyond the periphery of the disk, in the peripheral space and adjacent to the inner wall of the contour. The distributor also comprises a cone arranged above the disk and integral with the latter, the cone allowing the ground coffee to flow into the peripheral space while minimizing pressure on the ground coffee in the bottom of the storage reservoir. In addition, the distributor comprises an aperture on the inner wall of the contour, close to the bottom of the storage reservoir, for transferring the ground coffee.

This design of the ground coffee dispenser according to the document FR2682271A1 has several drawbacks. The configuration of the blades has the effect of working in opposition when the disk rotates, by pushing the ground coffee against the inner wall of the contour, in the peripheral space. This considerably increases the compaction of the ground coffee in the peripheral space and the forces on the curved blades, which necessitates equipping the ground coffee dispenser with a powerful disk drive motor, which is thus larger and more expensive. In addition, the placement of the ground coffee transfer aperture on the inner wall of the contour requires separating the storage reservoir from the filter holder on the coffee machine, which increases its dimensions.

The applicant is also aware of the patent application US2008230568A1 making reference to the ground coffee dispenser described in the aforementioned patent application FR2682271A1. This document US2008230568A1 deals with a bulk product dispenser configured for continuous flow of a metered quantity of the said bulk product, whose grain size is very variable. The dispenser comprises a container to receive the bulk product, the said container comprising a contour and a bottom provided with an aperture for transferring the bulk product. A rotating disk is arranged in the bottom of the container and has a diameter corresponding to the diameter of the inner wall of the contour. This disk is provided with a peripheral edge and comprises a vertical ramp which partly extends from the peripheral edge and in a more or less radial manner towards the center of the said disk. This vertical ramp is provided with an opening allowing the bulk product to enter underneath the disk. In this way, while the disk rotates, the bulk product is forced to penetrate underneath the disk, through the opening. The dimensions of the opening and the speed of rotation of the disk make it possible to meter the flow of bulk product penetrating underneath the disk and then leaving through the transfer aperture. Below its lower face this disk comprises curved blades which extend towards the transfer aperture arranged in the center below the disk, and which are configured to distribute around the disk the flow of bulk product penetrating through the opening.

The bulk product dispenser according to US2008230568A1 is designed to operate in continuous flow and is particularly suited for industrial operations for continuous dispensing of bulk product having very variable grain sizes in the plastics, chemical, agri-food, cosmetic, or pharmaceutical fields, in particular. The vertical ramp on the disk, arranged more or less in the radial direction, is in opposition with respect to the bulk product during the rotation of the disk, which has the effect of generating significant forces on this disk and, in this way, of necessitating the use of a powerful motor in order to have a high torque allowing this disk to be driven, in particular at start-up. This disk design is not appropriate for piecemeal operation on a coffee machine, with a motor start-up and shut-off over a short duration each time ground coffee is transferred towards the filter holder. This implementation allows metering the flow of bulk product leaving in continuous flow from the container as part of continuous operation of the disk, but it is not appropriate for quantifying the precise volume of ground coffee leaving the container on an occasional basis, for very short periods of disk activation.

SUMMARY OF THE INVENTION

The purpose of this invention is to implement a ground coffee dispenser for a coffee machine which remedies the aforementioned drawbacks, with the goal of obtaining a compact and inexpensive coffee machine.

To this end, the invention concerns a ground coffee dispenser intended to cooperate with a coffee machine. The ground coffee dispenser comprises a ground coffee storage reservoir provided with a contour and a bottom, and a ground coffee distributor pouring a predefined quantity of ground coffee from the storage reservoir towards a brewing area of the coffee machine.

The ground coffee distributor comprises a disk configured to be driven in rotation. At least one curved blade is attached on a lower face of this disk. The disk has a periphery inscribed in a circle having a diameter D, the quantity of ground coffee poured being defined by a peripheral space provided between the diameter D of the periphery of the disk and an inner wall of the contour, close to the bottom of the storage reservoir.

In addition, the bottom of the storage reservoir comprises an aperture for transferring the ground coffee, arranged below the disk. The curved blade extends from the periphery of the disk towards the interior of the said disk, and is curved so as to transfer the ground coffee introduced through the peripheral space towards the interior of the disk, up to the transfer aperture, when the said disk rotates.

In this way, the design of the ground coffee dispenser according to the invention allows precisely quantifying the ground coffee transferred, the latter being defined by the quantity of ground coffee falling into the peripheral space between the periphery of the disk and the inner wall of the contour when the disk rotates. The curved shape of the at least one blade allows accompanying the ground coffee to the transfer aperture without any opposition, which considerably reduces the forces exerted on the disk and allows the use of a smaller, less powerful and less expensive motor to drive the said disk.

Advantageously, the peripheral space left between the periphery of the disk and the inner wall of the contour has a thickness of between 0.5 and 2 mm, preferably between 0.75 mm and 1.75 mm. This prevents any trapping of ground coffee particles between the disk and the inner wall.

Preferably, the disk comprises between its periphery and the circle of diameter D an additional ground coffee intake area, arranged upstream of the curved blade, with respect to the direction of rotation of the disk. In addition, the additional intake area has a thickness which increases progressively as one approaches the curved blade. This also helps to prevent any risk of trapping due to the grain size of the ground coffee particles.

Advantageously, the disk comprises a downturned peripheral edge arranged opposite the inner wall. In addition, the peripheral edge comprises at least one opening situated upstream of the curved blade, with respect to the direction of rotation of the disk. This allows precisely defining the ground coffee entry area below the disk, at the periphery of the said disk, just downstream of the distal extremity of the blade adjacent to the said peripheral edge.

According to an advantageous implementation of the ground coffee dispenser, the disk is extended in the upper part by a hollow bell-shaped member, the aforementioned peripheral edge forming a lower part of the said disk. This design allows implementation of a single hollow part in one piece, this hollow shape preventing any risk of compaction of the ground coffee below the disk. In this way, an appropriate flow of the ground coffee below the disk and through the transfer aperture on the bottom of the container is preserved. In addition, this bell shape helps the ground coffee drop appropriately into the storage reservoir towards the peripheral space between the peripheral edge and the inner wall of the contour. This bell shape further allows the implementation of an upper extremity configured for easy handling of the part, in order to extract it easily from the storage reservoir to perform maintenance on it. Variants may be envisioned, for example, a hollow cone shape replacing the bell shape. One could also envision a disk and a bell which are attached to one another, rather than being in one piece.

Preferably, according to this aforementioned implementation of the ground coffee dispenser, the member comprises at least one first rib arranged in the periphery adjacent to the upper part of the disk, more or less plumb with the curved blade, that is, aligned with the blade. The first rib will preferably also have a curved form oriented in the direction of rotation of the disk, in order to reduce the forces exerted on the latter during its rotation. These first ribs prevent the ground coffee from becoming set in place and remaining static in the storage reservoir, which helps the ground coffee drop into the peripheral space. The curved shape of the first rib also helps the ground coffee drop into the peripheral space.

Advantageously, the disk comprises a member for scraping the bottom of the storage reservoir and cleaning the transfer aperture. This scraping member also helps to prevent the ground coffee from being compacted below the disk, so that it can flow appropriately. Preferably, this scraping member is flexible, for example made of elastomeric material, but a rigid member could be envisioned.

Preferably, the disk is driven in rotation by a motor. Preferably, the disk is driven in rotation about a vertical axis, the motor being arranged at the center of the disk with respect to the vertical axis. In fact, the technical characteristics of the ground coffee dispenser, as mentioned above, advantageously allow a considerable reduction in torque and, in this way, the use of a much less powerful and more compact motor, which advantageously allows introducing it directly in the axis of rotation of the disk, in particular in the aforementioned bell shape. Thus, it is not necessary to separate the motor because of its size and use a transmission system arranged between this motor and the disk.

Advantageously, this comprises a transfer device which includes a member for opening and closing the transfer aperture, able to move between an open position and a closed position. The mobile member for opening and closing the transfer aperture is driven by an operating lever and a transmission system.

Preferably, the dispenser comprises control means configured to ensure start-up of the drive motor of the disk when the aforementioned operating lever is activated. However, one could envision independent control of the motor, after having previously activated the operating lever.

Advantageously, the inner wall of the contour of the storage reservoir comprises at least a second rib extending on at least a portion of its height close to the peripheral space. The presence of these second ribs helps the ground coffee drop into the storage reservoir and prevents the said ground coffee from turning with the disk in the said storage reservoir.

The invention also concerns a coffee machine comprising a ground coffee dispenser which has one and/or the other of the aforementioned characteristics.

BRIEF DESCRIPTION OF THE FIGURES

The characteristics and advantages of the invention will be seen by reading the following description of a preferential and non-restrictive embodiment of a coffee machine equipped with a ground coffee dispenser, relying on figures among which.

DETAILED DESCRIPTION

Figure 1:
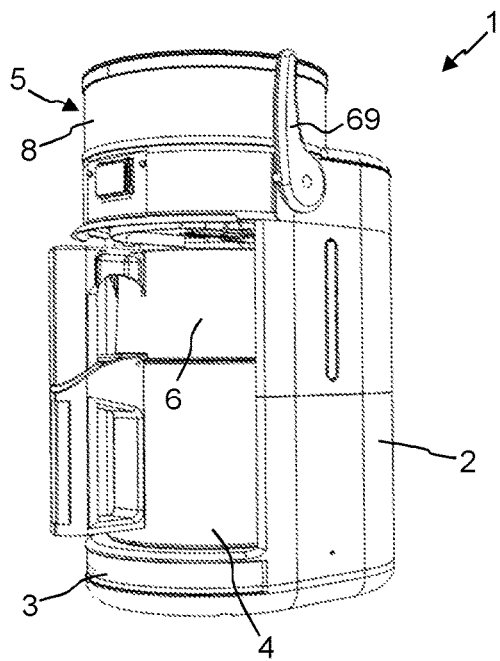
FIGS. 1 and 2 illustrate the coffee machine in two positions of a handling member corresponding, respectively, to the closure of the transfer aperture between the storage reservoir and the filter holder, and to the opening of the transfer aperture for transferring the ground coffee from the storage reservoir towards the brewing area, during the rotation of the disk.
Figure 2:
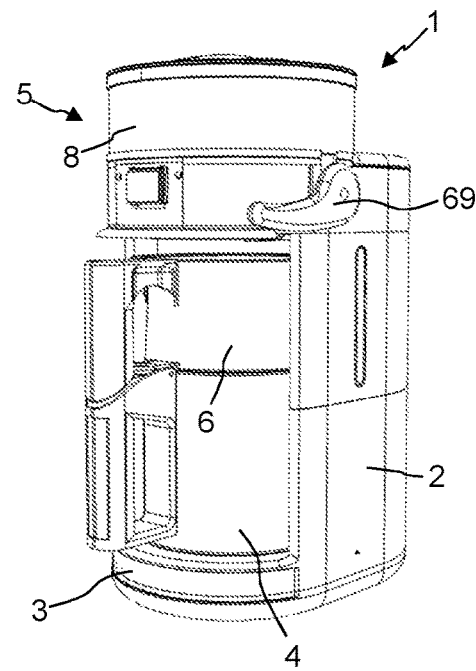
Figure 3:
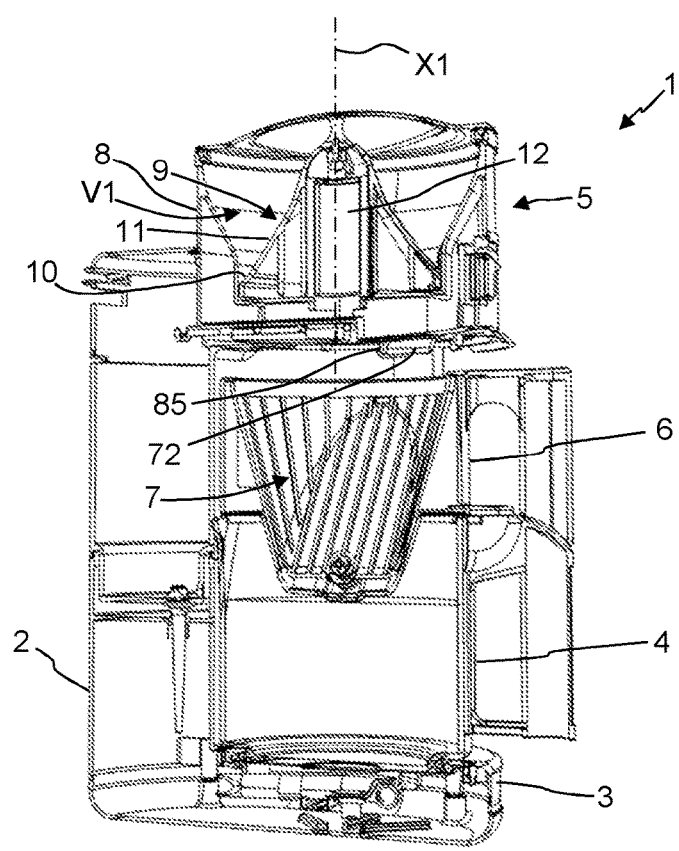
FIG. 3 illustrates the coffee machine in cross section in order to highlight some of its components.

FIGS. 1 to 3 show the coffee machine 1 according to the invention, in a preferred design mode. The term "machine 1" is used in the rest of the description to define the said coffee machine 1.

The machine 1 traditionally comprises a member 2 provided with a heating base 3 configured to receive a coffee pot 4 into which the coffee beverage (not illustrated) is discharged. The machine 1 comprises a ground coffee dispenser 5 arranged above a filter holder 6, the filter holder defining a brewing area 7.

Figure 4:
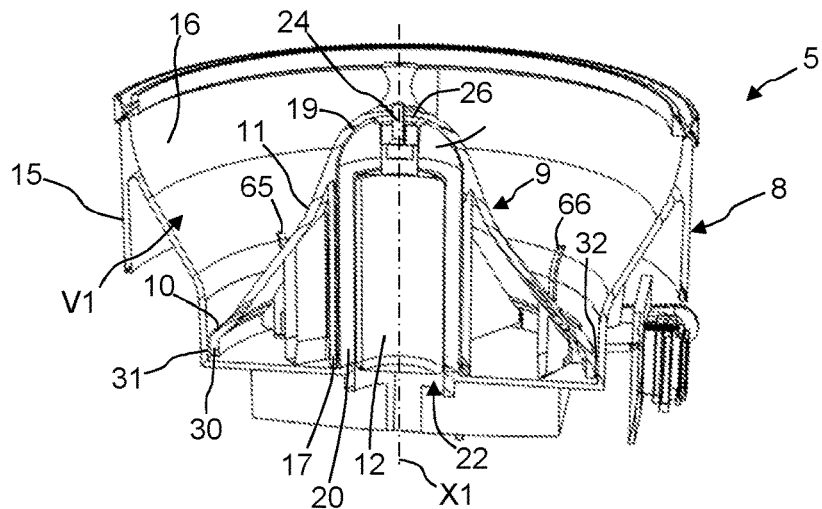
FIG. 4 illustrates in cross section the ground coffee dispenser arranged on the coffee machine.

The ground coffee dispenser 5 comprises a storage reservoir 8 defining a volume V1 allowing a certain quantity of ground coffee to be received, for example the equivalent of a 250-gram package of ground coffee, which is generally commercially available. This storage reservoir 8 integrates a turbine 9 which is hollow and comprises a disk 10 in its lower part, the said disk 10 being extended towards the top by a more or less bell-shaped member 11. This turbine 9 is driven in rotation about a first vertical axis X1 by means of a motor 12 arranged with respect to this axis X1 inside the member 11, as illustrated in FIGS. 3 and 4. In FIGS. 1 to 3 it is observed that the storage reservoir 8 is arranged with respect to the same vertical axis as the filter holder 6 and as the coffee pot 4, in this case the axis X1.

Figure 5:
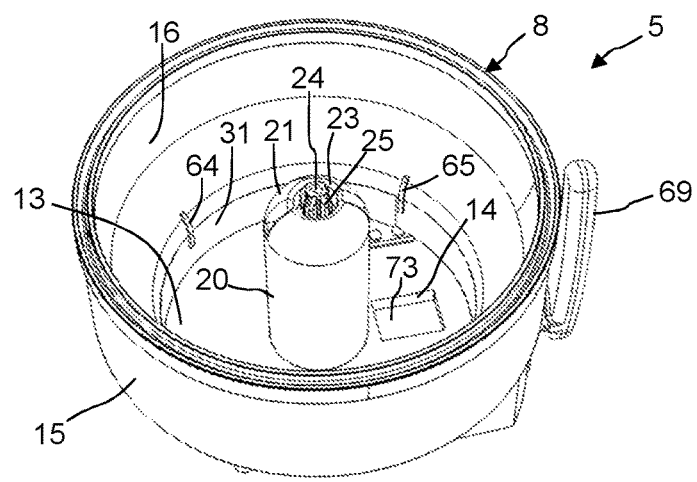
FIG. 5 illustrates a top view of the storage reservoir, highlighting the transfer aperture in the bottom and the closure of this transfer aperture by an opening and closing member.

As illustrated in FIG. 5, the storage reservoir 8 comprises a bottom 13 provided with a transfer aperture 14 having a square shape, other shapes being practicable. This transfer aperture 14 allows the ground coffee to pass from the said storage reservoir 8 towards the brewing area 7 of the filter holder 6. The storage reservoir 8 comprises a cylindrical contour 15 which has an inner wall 16.

As illustrated with regard to FIGS. 3 to 5 and 8, the turbine 9 is hollow and has an inner tubular portion 17 which defines a first housing 18 having a tapered bottom 19. The storage reservoir 8 comprises a tubular part 20 arranged with respect to the axis X1 and comprising a tapered extremity 21. The shape of the tapered part 20 is complementary to the first housing 18, in order to be inserted in the latter. This tubular part 20 defines a second housing 22 allowing the motor 12 to be received. The bottom 21 of the tubular part 20 comprises a through hole 23 allowing the passage of the shaft 24 of the motor 12 when the latter is positioned in the second housing 22. This shaft 24 comprises teeth 25. The bottom 19 of the first housing 18 comprises a hollow stud 26 provided with internal gear teeth 27, this hollow stud 26 being housed in the through hole 23 and meshing with the shaft 24 when the inner tubular portion 17 is mounted on the tubular part 20.

The bell-shaped member 11 extends the disk 10 on the upper part of the turbine 9, and forms a single piece with the latter. As illustrated in particular in FIG. 6, the upper extremity 28 of the member 11 comprises a circular groove 29, which facilitates the manipulation of the turbine 9 when it is positioned in the storage reservoir 8 or when it is removed from the latter.

As illustrated with regard to FIGS. 4 to 8, when the turbine 9 is engaged in the storage reservoir 8, the disk 10 is positioned above the bottom 13 and above the transfer aperture 14. This disk 10 comprises in its lower part a downturned peripheral edge 30 which is arranged opposite the lower peripheral edge 31 of the inner wall 16 of the contour 15, with a peripheral space 32 between the said elements defining an edge gap. The quantity of ground coffee poured through the transfer aperture 14 is defined by this peripheral space 32 close to the bottom 13 of the storage reservoir 8.

Figure 8:
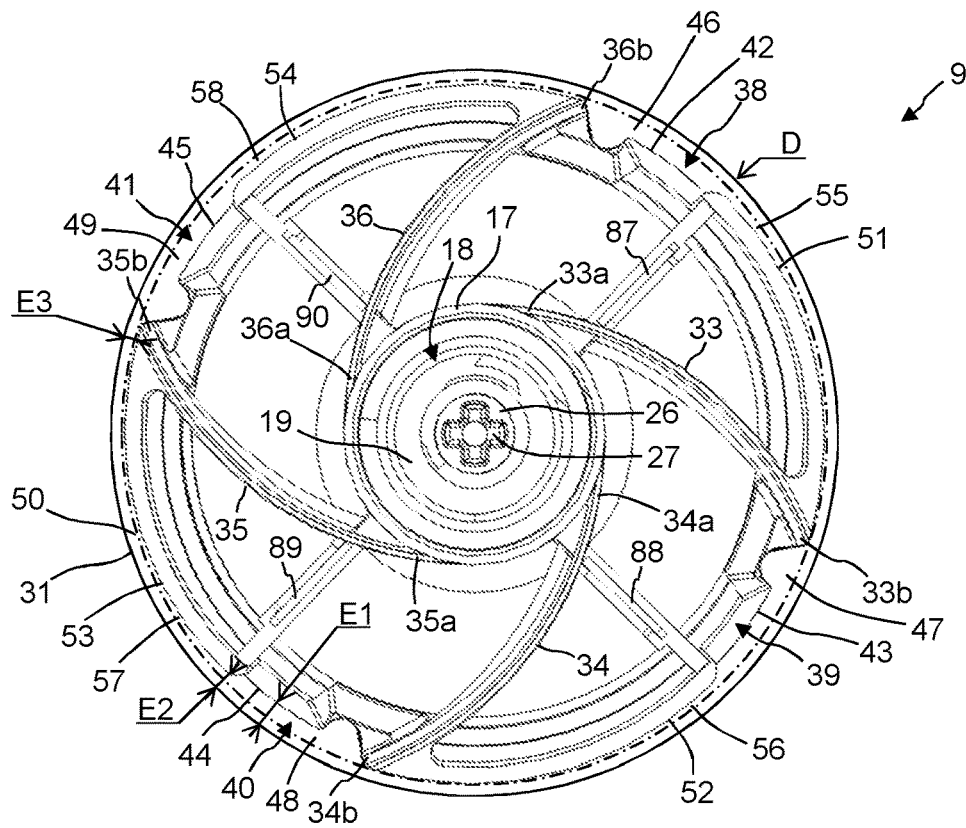
FIG. 8 illustrates a bottom view of the turbine in FIG. 6, highlighting the curved blades.

As illustrated in FIG. 8, the disk 10 comprises on its lower face four blades 33-36, each of which has a curved shape. The proximal extremities 33a-36a of these blades 33-36 are integral with the inner tubular portion 17 of the turbine 9. The distal extremities 33b-36b of the blades 33-36 lead to the peripheral edge 30. The distal extremities 33b-36b are arranged downstream of the proximal extremities, taking into account the direction of rotation of the turbine 9 represented by the arrow 37. Four openings 38-41 are provided on the peripheral edge 30 respectively downstream of the distal extremities 33b-36b of the four blades 33-36. At these four openings 38-41, the disk 10 comprises four notches 42-45 defining recesses with respect to the peripheral edge 30, which makes it possible to form four main intake areas 46-49 to ensure that the ground coffee drops into the peripheral space 32.

As illustrated in FIG. 8, the peripheral edge 30 of the disk 10 is inscribed in a circle 50 of diameter D. In addition, the diameter of the peripheral edge 30 decreases slightly between each portion 51-54 delimited by two distal extremities 33b-36b of two blades 33-36, as one approaches the distal extremity of the posterior blade, taking the direction of rotation into account. These portions 51-54 are provided respectively downstream of the four notches 42-45. The decreasing peripheral edge 30 makes it possible to form four additional ground coffee intake areas 55-58, provided downstream respectively of the four main intake areas, in the peripheral space 32.

Preferably, as illustrated in FIG. 8, the main intake area 46-49 has a constant thickness E1 between the notch 42-45 on the disk 10 and the lower peripheral edge 31 of the inner wall 16 of the contour 15, which is between 2 mm and 2.5 mm, preferably equal to 2.25 mm.

Likewise, as illustrated in FIG. 8, the additional intake area 55-58 comprises a thickness between the portion 51-54 on the disk 10 and the lower peripheral edge 31 of the inner wall 16 of the contour 15 which increases progressively between two blades 33-36, this thickness being minimal E2 and between 0.5 mm and 1 mm, preferably 0.75 mm, at the downstream blade, and maximal E3 and between 1.5 mm and 2 mm, preferably 1.75 mm, at the upstream blade.

The transfer aperture 14 on the bottom 13 of the storage reservoir 8 is positioned below the disk 10. The blades 33-36 extend from the peripheral edge 30 to the transfer aperture 14, and beyond, which allows the ground coffee introduced through the peripheral space 32 to be channeled towards the interior of the disk 10, until this ground coffee reaches the transfer aperture 14, when the disk 10 rotates.

Figure 6:
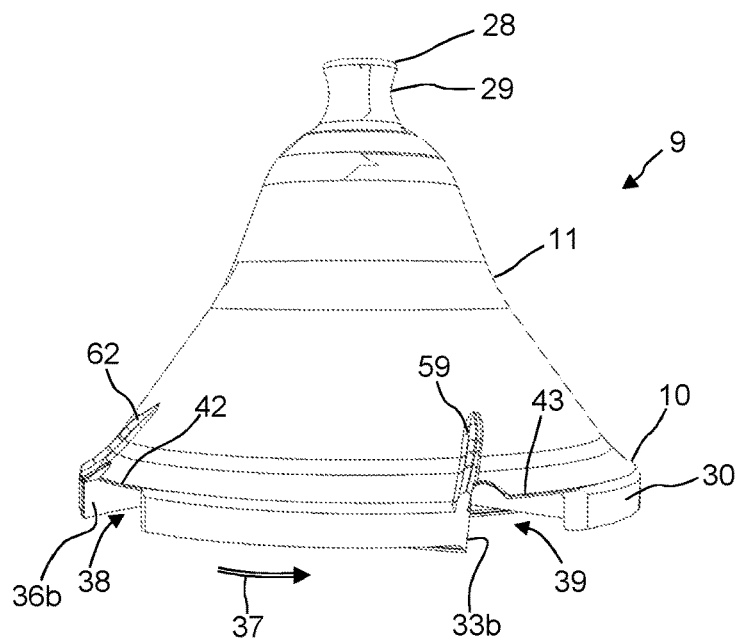
FIG. 6 illustrates an overview of a turbine consisting of the disk with an upper part in the shape of a bell and a lower part having a peripheral edge.
Figure 7:
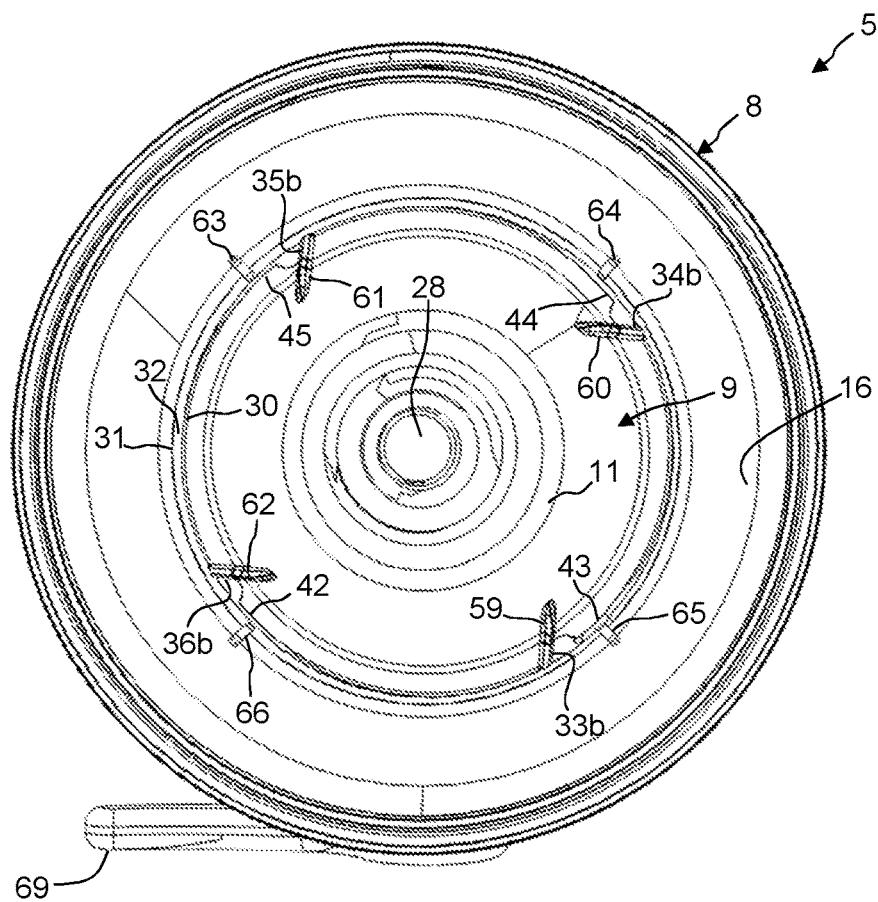
FIG. 7 illustrates a top view of the turbine in FIG. 6 in position in the storage reservoir.

As illustrated by FIGS. 6 and 7, the turbine 9 comprises first ribs 59-62 which have a slightly curved shape and extend in the upper part of the disk 10, plumb with the distal extremities 33b-36b of the blades 33-36. These first ribs 59-62 help the ground coffee drop towards the bottom 13 of the storage reservoir 8, into the peripheral space 32 during the rotation of the turbine 9.

As illustrated in FIGS. 4, 5 and 7, the inner wall 16 of the contour 15 comprises second ribs 63-66 distributed uniformly and extending in part towards the top from the lower peripheral edge 31. These second ribs 63-66 prevent the ground coffee in the storage reservoir 8 from turning with the turbine 9, which helps this ground coffee drop into the peripheral space 32.

The ground coffee dispenser 5 comprises a transfer device 67 which allows the release of the transfer aperture 14, in an open position, and the closure of the said transfer aperture 14, in a closed position. In the open position, the channeling of the ground coffee towards the transfer aperture 14 during the rotation of the disk 10 allows it to be extracted from the storage reservoir 8 and transferred towards the filter holder 6.

This transfer device 67, illustrated in FIGS. 5 and 9 to 12, comprises an opening and closing member 68 which is actuated by means of an operating lever 69 acting on a transmission system 70.

Figure 11:
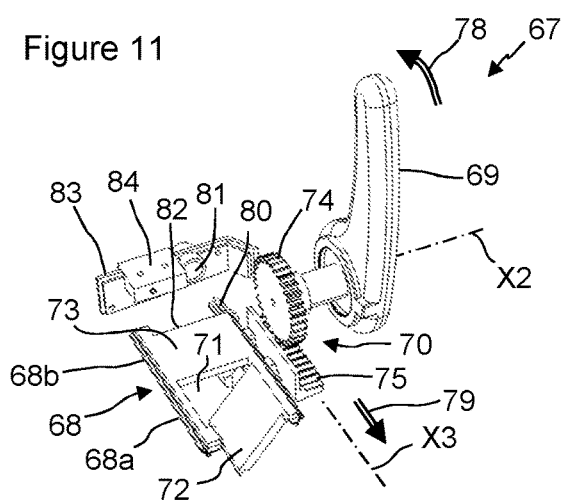
FIGS. 11 and 12 illustrate the member for opening and closing the transfer aperture and a control lever for this member, respectively in the closed position and in the open position.

The opening and closing member 68 comprises a first part 68a defining an opening 71 and an inclined wall 72 extending below this opening 71, as illustrated in particular in FIGS. 11 and 12. This opening and closing member 68 also comprises a second part 68b provided as an extension of the first part 68a and defining a horizontal wall 73.

The transmission system 70 is a rack 75 and pinion 74 system. The operating lever 69 is pivotably mounted with respect to a second horizontal axis X2, on the storage reservoir 8, as illustrated in particular in FIGS. 9 to 12. The pinion 74 is secured to the operating lever 69 and turns about this axis X2 during actuation of the said operating lever 69. This pinion 74 meshes with the rack 75, the rotation of the pinion 74 in one direction or the other resulting in the translational movement of the rack 75 in one direction or the other, respectively, about a third horizontal axis X3 illustrated in FIGS. 11 and 12. The opening and closing member 68 is slidably engaged with respect to the storage reservoir 8, with respect to this third axis X3. This opening and closing member 68 is secured to the rack 75. Thus, as illustrated in FIG. 12, the actuation in rotation of the operating lever 69 in the direction of the first arrow 76 about the second axis X2, results in a translational movement of the opening and closing member 68 in the direction of the second arrow 77 about the third axis X3. Conversely, as illustrated in FIG. 11, the actuation in rotation of the operating lever 69 in the direction of the third arrow 78 about the second axis X2, results in a translational movement of the opening and closing member 68 in the direction of the fourth arrow 79 about the third axis X3.

When the operating lever 69 is in the upward vertical position, as illustrated in FIGS. 1, 5, 9 and 11, the horizontal wall 73 closes the aperture 14. Conversely, when the operating lever 69 is in the frontward horizontal position, as illustrated in FIGS. 2, 10 and 12, the opening 71 and the inclined wall 72 are positioned below the transfer aperture 14, which releases this transfer aperture 14 and allows the ground coffee to flow from the storage reservoir 8 towards the filter holder 6.

A spring (not illustrated) is mounted between a stud 80 which is mounted on a first extremity of the spring and a housing 81 which receives a second extremity of the spring. The stud 80 is arranged at the rear extremity 82 of the opening and closing member 68 and the housing 81 is arranged on an edge 83 of the storage reservoir 8, as illustrated in FIGS. 9 to 12. When the rear extremity 82 of the opening and closing member 68 is bearing against the edge 83, in the opening position corresponding to the actuation of the operating lever 69 towards its frontward horizontal position, as illustrated in FIGS. 2, 10 and 12, the spring (not illustrated) is compressed between the stud 80 and the housing 81. When the operating lever 69 is released, the spring releases and ensures that the opening and closing member 68 returns to the closed position, the member then moving in the direction of the fourth arrow 79, which makes the said operating lever 69 pivot in the direction of the third arrow 78 and brings it to the upward vertical position, illustrated in particular in FIGS. 9 and 11.

Figure 9:
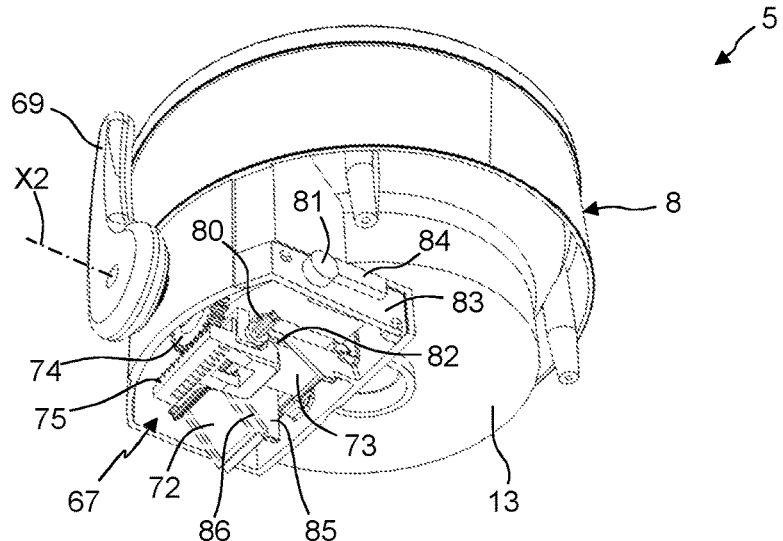
FIG. 9 illustrates a bottom view of the storage reservoir with a member for opening and closing the transfer aperture in the closed position.
Figure 12:
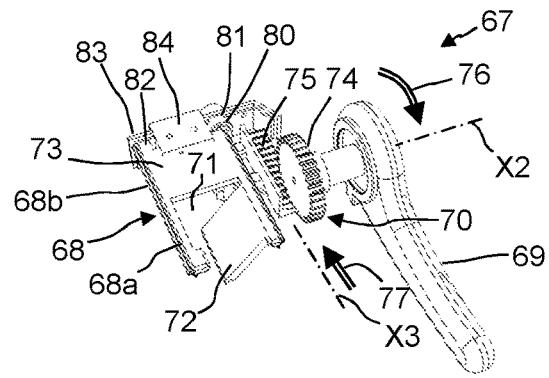

As illustrated in FIGS. 9 and 12, the machine 1 comprises a sensor 84 arranged on the edge 83, for example a switch, which is activated when the rear extremity 82 of the opening and closing member 68 bears against the edge 83, that is, in the open position according to which the opening 71 and the inclined wall 72 are arranged below the transfer aperture 14. The activation of the sensor 84 results in the start-up of the motor 12 and the rotation of the turbine 9, which allows the disk 10 to push the ground coffee through the transfer aperture 14 and the opening 71, the said ground coffee then being guided by the slope of the inclined wall 72 during its fall into the filter holder 6. The inclined wall 72 is oriented to guide the ground coffee towards the center of the filter holder 6, as illustrated in particular in FIG. 3.

Figure 10:
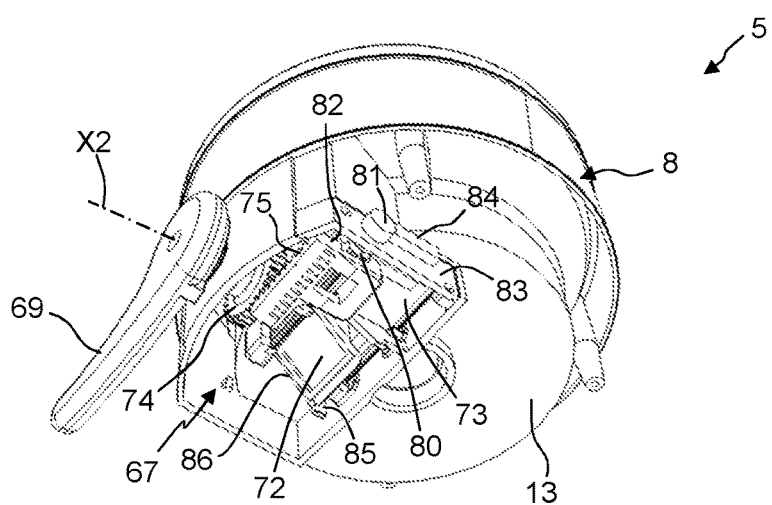
FIG. 10 illustrates a bottom view of the storage reservoir with a member for opening and closing the transfer aperture in the open position.

The storage reservoir 8 comprises below its bottom 13 a cleaning member in the form of a vertical wall 85 provided with an inclined panel 86 having a slope identical to that of the inclined wall 72, as illustrated in FIGS. 9 and 10. The inclined panel 86 is adjacent to the inclined wall 72, so as to scrape the said inclined wall 72 when the opening and closing member 68 moves from the open position to the closed position, and vice versa. Regular cleaning of the inclined wall 72 prevents the accumulation of ground coffee on the latter, caused in particular by the moisture present due to steam and condensation. This allows precisely metering the ground coffee falling into the filter holder 6, each time the operating lever 69 is activated.

As illustrated in FIG. 8, the disk 10 comprises on its lower face four scraping members 87-90 which are in contact with the bottom 13 of the storage reservoir 8 and sweep the latter and the transfer aperture 14 during the rotation of the turbine 9.

These scraping members 87-90 are made of a flexible material, an elastomer in particular.

The preceding description of a preferred embodiment is not restrictive. This preferred implementation of the ground coffee dispenser 5 on the machine 1 advantageously allows its design and manufacturing cost to be simplified by using a compact, low-power motor 12.

However, many variants may be considered, in particular as to the design of the disk 10. In particular, one could envision a disk 10 with a peripheral edge 30 having a constant diameter equal to the diameter D of the circle 50, without any decrease between two distal extremities 33b-36b of blades 33-36, in which case the additional intake area 55-58 would not exist and the thickness of the peripheral space 32 between each portion 51-54 on the disk 10 and the lower peripheral edge 31 of the inner wall 16 of the contour 15 would be constant, this thickness corresponding to the minimal thickness E2 of between 0.5 mm and 1 mm, preferably 0.75 mm.

One could also envision variants of the transfer device 67, without departing from the context of the invention.

The invention claimed is:

1. A ground coffee dispenser configured to cooperate with a coffee machine and which comprises a ground coffee storage reservoir provided with a contour and a bottom and a ground coffee distributor pouring a predefined quantity of ground coffee from the storage reservoir towards a brewing area of the coffee machine, the ground coffee distributor comprising a disk driven in rotation on which at least one curved blade is attached on a lower face of the disk, the disk having a peripheral wall forming a periphery of the disk, the quantity of ground coffee poured being defined by a peripheral space provided between a diameter of the periphery of the disk and an inner wall of the contour, adjacent the bottom of the storage reservoir, wherein the bottom of the storage reservoir comprises a transfer aperture, arranged below the disk, for transferring the ground coffee and wherein each curved blade of the at least one curved blade extends from a respective opening defined in the peripheral wall of the disk towards the interior of the disk to transfer the ground coffee introduced through the peripheral space into the transfer aperture via said respective opening, when the disk rotates, said peripheral wall extending along the periphery of the disk upstream and downstream of the at least one curved blade with respect to a direction of rotation of the disk.

2. The ground coffee dispenser according to claim 1, wherein the peripheral space left between the periphery of the disk and the inner wall of the contour has a thickness of between 0.5 and 2 mm.

3. The ground coffee dispenser according to claim 1, wherein the disk comprises between the periphery and the diameter an additional ground coffee intake area, arranged upstream of the curved blade, with respect to the direction of rotation of the disk, the additional ground coffee intake area having a thickness which increases progressively towards the curved blade.

4. The ground coffee dispenser according to claim 1, wherein the peripheral wall is arranged opposite the inner wall.

5. The ground coffee dispenser according to claim 4, wherein the disk has a lower part and an upper part, wherein the disk is extended in the upper part by a bell-shaped member, the peripheral wall forming the lower part of said disk.

6. The ground coffee dispenser according to claim 5, wherein the bell-shaped member comprises at least one rib arranged in the periphery, plumb with the curved blade.

7. The ground coffee dispenser according to claim 1, wherein the disk comprises a scraping member for scraping the bottom of the storage reservoir and cleaning the transfer aperture.

8. The ground coffee dispenser according to claim 7, wherein the scraping member is flexible.

9. The ground coffee dispenser according to claim 1, wherein the disk is driven in rotation by a motor.

10. The ground coffee dispenser according to claim 9, wherein the disk is driven in rotation about a vertical axis, the motor being arranged at a center of the disk with respect to the vertical axis.

11. The ground coffee dispenser according to claim 1, further comprising a transfer device which comprises an opening and closing member for opening and closing the transfer aperture able to move between an open position and a closed position, the opening and closing member being driven by an operating lever and a transmission system.

12. The ground coffee dispenser according to claim 11, further comprising a control system configured to ensure start-up of a drive motor of the disk when the operating lever is activated.

13. The ground coffee dispenser according to claim 1, wherein the inner wall comprises a rib that is adjacent the peripheral space.

14. A coffee machine comprising a ground coffee dispenser according to claim 1.

15. The ground coffee dispenser according to claim 2, wherein the thickness is between 0.75 and 1.75 mm.

16. The ground coffee dispenser according to claim 1, wherein a bell-shaped member is directly connected to, and extends from, a top portion of the peripheral wall of the disk, the disk and bell-shaped member forming a one-piece element.

17. The ground coffee dispenser according to claim 1, wherein a distance from the peripheral wall to a center of the disk varies along the periphery of the disk.

18. The ground coffee dispenser according to claim 1, wherein the at least one curved blade includes a first and a second curved blade, and wherein, along the periphery of the disk and between the first and the second curved blade, a distance between the peripheral wall and the inner wall increases.

* * * * *